May 7, 1963　　　　A. FRANZ　　　　3,088,278
GAS TURBINE ENGINE
Filed May 1, 1957　　　　　　　　　　　　5 Sheets-Sheet 1

INVENTOR
ANSELM FRANZ.

BY
ATTORNEYS.

May 7, 1963  A. FRANZ  3,088,278
GAS TURBINE ENGINE

Filed May 1, 1957  5 Sheets-Sheet 4

SECTION A-A

INVENTOR
ANSELM FRANZ.

BY
ATTORNEYS.

May 7, 1963 A. FRANZ 3,088,278
GAS TURBINE ENGINE

Filed May 1, 1957 5 Sheets-Sheet 5

INVENTOR.
ANSELM FRANZ.
BY
ATTORNEYS

United States Patent Office 3,088,278
Patented May 7, 1963

3,088,278
GAS TURBINE ENGINE
Anselm Franz, Stratford, Conn., assignor to Avco Manufacturing Corporation, Lycoming Division, Stratford, Conn., a corporation of Delaware
Filed May 1, 1957, Ser. No. 656,384
2 Claims. (Cl. 60—39.16)

This invention relates to a gas turbine power plant, and more particularly to a gas turbine engine operative for rotating a propeller shaft or other power shaft.

A gas turbine engine of the type herein considered is provided with a compressor, a combustion chamber, a turbine driving the compressor, and a power turbine extracting the power for driving the power output shaft.

Air is taken into the engine at the compressor inlet, compressed in the compressor and passed to the combustor, where it is mixed with fuel, and combustion takes place. The hot gas is passed into and through the two turbines, the compressor driving turbine and the power turbine.

The particular type of gas turbine power plant herein disclosed is a so-called free power turbine type in which the power turbine itself rotates independently of the compressor driving turbine—that is, the two turbines are not mechanically connected to rotate together but are on separate shafts rotating independently. With such a free power turbine type of engine, a simple solution for power extraction would be a so-called rear drive, but this places the gearing necessary to reduce the rotative speed of the turbine to that desirable for a power extracting shaft in the hot section of the engine.

With a conventional arrangement for this type of engine, wherein the air is taken in from the front of the engine into a compressor and subsequently passed to the combustor where it is mixed with fuel, burned, and then passed to the turbines, the axial positioning of these several components longitudinally of the engine makes for an engine of excessive length and locks compactness so necessary in the majority of applications of this type of engine. The excessive length of a conventional engine arrangement may exclude the possibility of using a so-called front drive, which in general is the most desirable kind of power extraction.

It is a primary object of this invention to provide a gas turbine engine of compact design appropriate also for front drive power extraction and with a length and diameter suitable for installation in aircraft or for other use and having a high standard of performance. Among the factors in the accomplishment of high performance, are the necessity to decelerate the air as it leaves the compressor to a very low velocity, to burn the air-fuel mixture in the combustion chamber with high efficiency, and to establish a suitable temperature profile at the entrance to the turbines. In straight axial engines, diffusion or deceleration of the air, combustion, and mixing, follow each other in an axial direction; and the length of the structure necessary to accomplish this result is additive, and it is therefore necessary in normal designs to keep those lengths often shorter than desirable in order to avoid excessive engine lengths. The present invention solves this problem by using radial flow channels for diffusion, a limited axial space for further diffusion, and by employing a folded design of combustor positioned around the turbines. The products of combustion and the dilution air from the diffuser are mixed and directed inwardly to the turbine through a second substantially radial channel. By this arrangement it is possible to provide all the single processes with adequate flow lengths for superior performance of those components and at the same time to utilize only relatively short sections of the engine length.

By using radial distances for diffusion of air leaving the compressor, as described above, the maximum diameter of the engine is in general defined by this radial diffuser. It is apparent that the diameter of the air inlet and compressor in front of said diffuser will be smaller than the maximum engine diameter, thus providing space for mounting of accessories, such as starter, generator, fuel system components, etc., without objectionable protrusion of such components beyond the maximum diameter of the engine.

It is a further object of the present invention to accomplish a division of the so-called hot part of the engine adjacent the combustor and turbines from the cooler part of the engine. The gear reduction is most suitably located in the cool front section of the engine near the compressor and away from excesive heat of burning gases and the exhaust. Among the advantages of locating the gear reduction in the cool section of the engine are the more efficient lubrication and the solution of many problems attending high temperatures.

It is a further important object of the invention to provide an accessible combustor and turbine design which may be separated for inspection and service, and, to this end, a removable portion of the engine is provided which exposes the turbine and combustion chamber by the removal of such a section preferably at the rear of the engine.

It is a further object to provide a high performance combustion chamber with minimum flow losses, while accomplishing a reversal of flow necessary for this type of combustor surrounding the turbines.

The above and other objects of the invention will appear more fully from the following more detailed description and by reference to the accompanying drawings forming a part hereof, and wherein.

Figure 1:
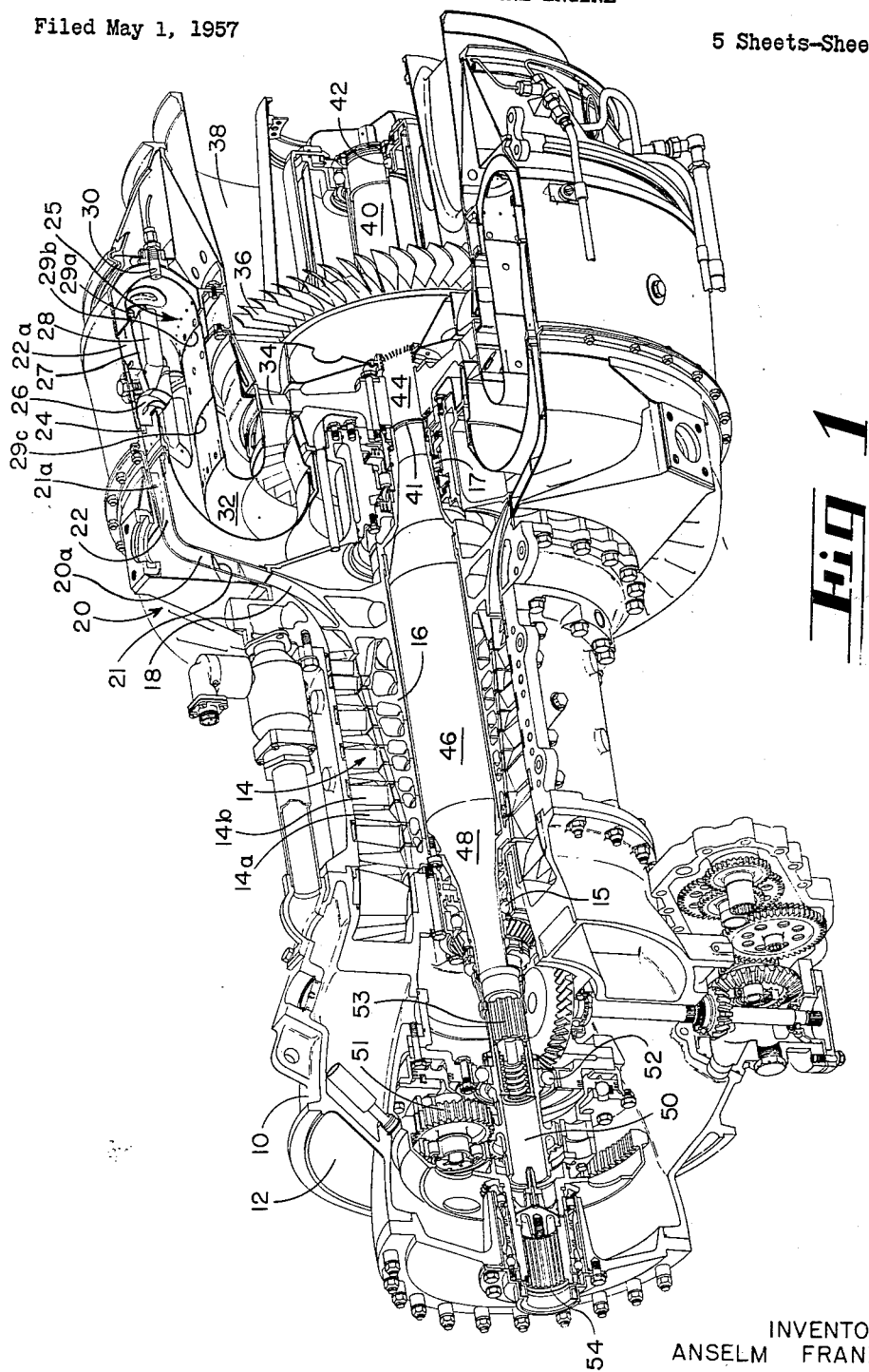
FIGURE 1 is a perspective sectional view of the assembled gas turbine engine.
Figure 2:
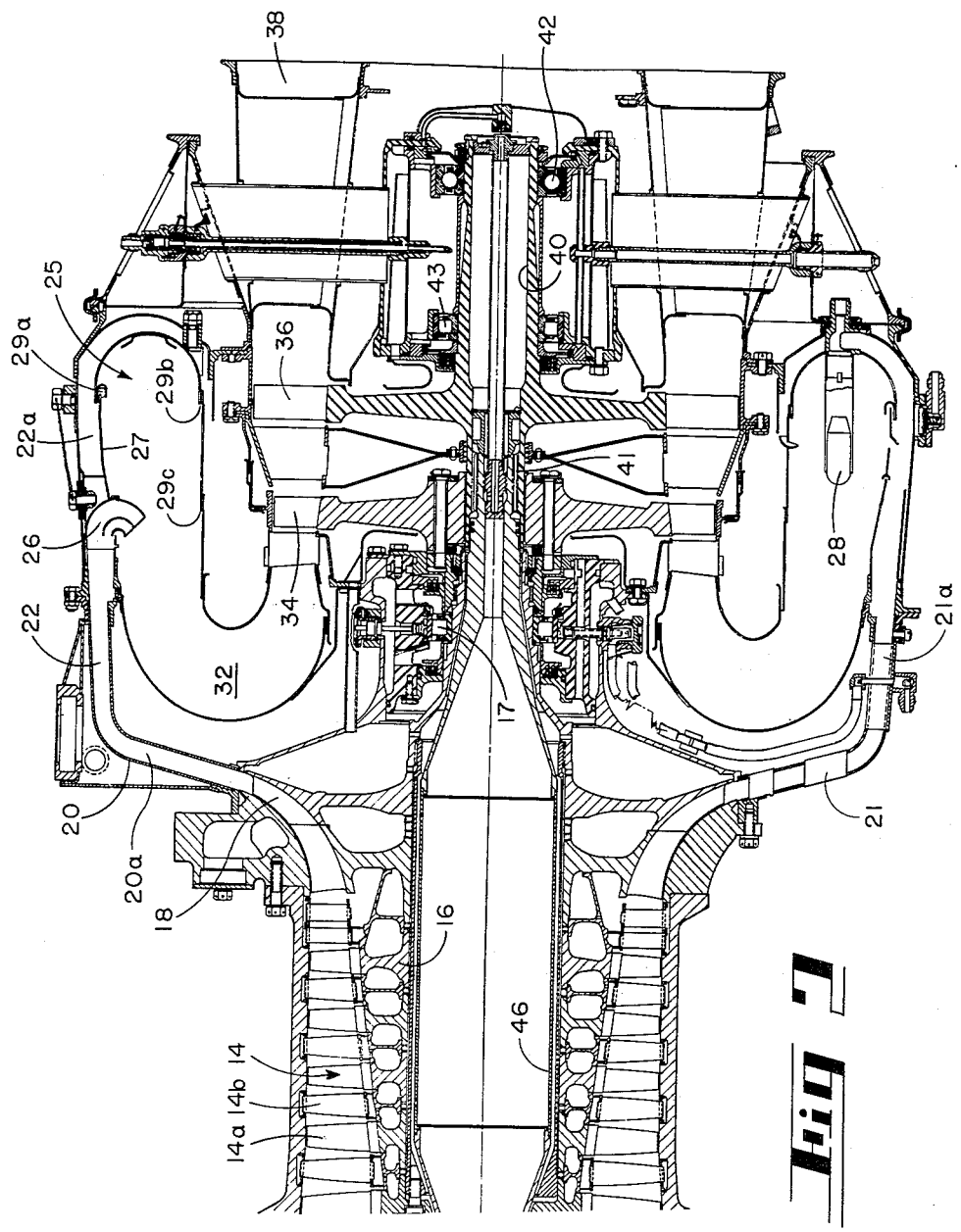
FIGURE 2 is a longitudinal cross-section through the engine in the regions of the compressor, combustor and turbines.
Figure 7:
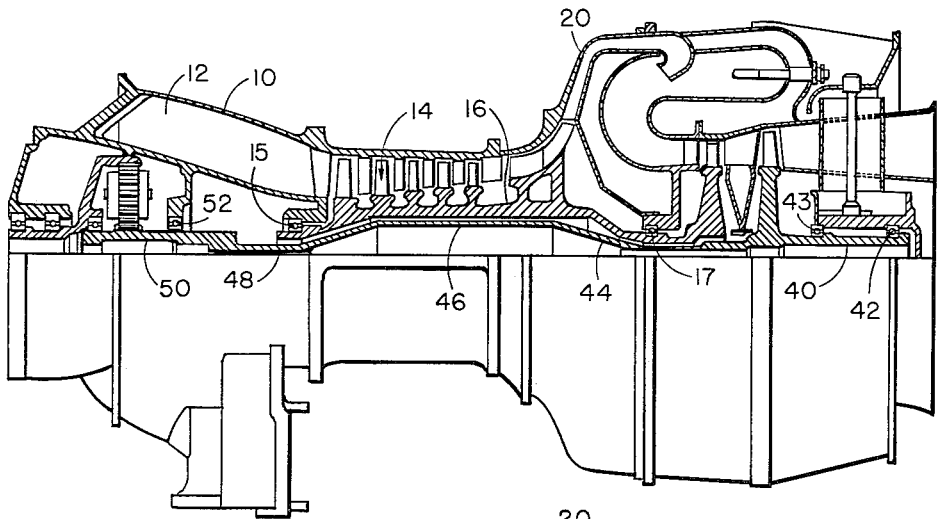
FIGURE 7 is a schematic cross-section of the engine showing the general arrangement particularly of the bearings and shafts in the preferred embodiment of the engine.

Referring to the drawings and particularly to the perspective cutaway view of FIGURE 1, as well as FIGURES 2 and 7, a housing 10 in the forward portion of the engine provides for air inlet 12, from which inlet air feeds into an axial flow multi-stage compressor 14. This compressor is driven by a hollow shaft 16 from turbine 34. The compressor shaft 16 carries circumferential rows of axially spaced blades mounted on rotors 14a, one row for each axial compressor stage. There are also rows of stators 14b to direct the air into each successive stage. The several stages of axial flow compression are followed, in the embodiment shown in FIGURE 1, by a radial stage, so called centrifugal compressor rotor 18, also carried in rotation by shaft 16, which rotor form the last stage of the air compressor unit.

Referring to FIGURES 2 and 7 in addition to FIGURE 1, it appears that the hollow compressor driving shaft 16 is carried by a bearing 15 at the inlet end of the compressor and by a bearing 17 at the opposite end adjacent the turbine rotor 34 also mounted on shaft 16, later to be described, which rotates the compressor.

Air discharge from the last stage 18 of the compressor is of relatively high velocity and (as shown in FIGURES 1 and 2) discharges outward into a diffuser housing 20 which defines a radially extending diffuser flow passage 20a. This passage provides for a flow of air from the relatively high velocity stream at the exit from the compressor in a gradually increasing flow area. The diffuser is provided with vanes 21 to aid and support the diffusion process of reducing velocity. The passage 20a flows into an outer casing passage which is an annular air chamber 22 extending rearwardly in an axial direction. Since the air stream even in the chamber 22 still has some circumferential component of velocity, guide vanes 21a (see FIGURES 1 and 2) are provided. It is understood that vanes 21a are circumferentially spaced in the annular air chamber 22. The flow of air therefore is guided into channels so that substantially one-half of the flow is scooped into dilution air scoops 26 (see FIGURES 1 and 2), which part provides for air dilution of hot gases, as will be later described. The portion of the air stream not covered by scoops flows on in chamber 22a. The annular air chamber 22a surrounds the combustion space or chamber 25, and supplies air for the primary section of the chamber 25. There is a common wall 27 between air chamber 22a and combustion space 25. The annular form of the diffuser 20, air channels 22, 22a and combustion space 25 appears on reference to FIGURES 1 and 2, and it is particularly to be noted that there are circumferentially positioned scoops arranged at intervals in the annular space so that a portion of the passage is spanned by the scoops 26, leaving a primary air passage 24 however between adjacent scoops for by-passing a portion of the air into the channel 22a (see FIGURE 1). Thus, the flow of compressed air is divided into primary air through passage 24 and channel 22a and so-called dilution air diverted by scoops 26 into the combustion space 25 for dilution of combustion products. The primary air continuing in air channel 22a is fed into the combustion space at a plurality of openings in the common wall 27. Referring to the cross-section of FIGURES 1 and 2, openings 29a, 29b, and 29c are shown so arranged that flow through common wall 27 is in a direction such that outlet into combustion space 25 is in the direction of gas flow in that space—i.e., reversed in direction from flow in air channel 22a. Primary air and fuel provided through fuel injection units 28, a series of which are spaced around the annular chamber 25, are mixed and burned in the primary zone of said combustion chamber. Ignition is accomplished by igniters 30 during the starting cycle. The combustion products from the primary zone are then directed toward the left in combustion space 25, as viewed in the drawings. At the position opposite the dilution air scoops 26 previously mentioned; dilution air is fed into the combustion products. The gases make substantially a 180 degree turn during which thorough mixing is accomplished and the hot gases are guided into the compressor driving turbine 34 and subsequently through adjacent power turbine 36 and out the exhaust 38 at the rear of the engine.

The above-described combustor unit of annular form surrounds the turbines and is of generally reverse flow so-called folded arrangement, there being two 180 degree reversals of flow. The first 180 degree reversal is accomplished by reversing air flow from air channel 22a into combustion space 25 by both dilution air scoops 26 and a plurality of reversing air openings in the common wall between air channel 22a and combustion space 25. The second reversal into the turbine region is effected by the form of the channel at 32, as mentioned.

The path of the air from the last stage 18 of the compressor through the diffuser 20 is outward from the central portion of the engine, and the direction of the annular chamber 22 causes flow rearwardly from this diffuser but still in the outer region of the combustor. However, as above described and as appears in FIGURES 1 and 2, the path of the air, mixed fuel and air, and hot gases as they pass through the folded channel reverse flow combustor unit to the turbines is generally inward in a radial direction towards the central region of the engine, the two 180 degree reversals of flow being accompanied by progressive inward radial flow direction (see FIGURES 1 and 2). The combustor surrounds the turbines, and a radial outward movement of air in diffuser 20 combined with the radial inward movement in combustor passages 22a, 25, 32 results in use of radial space in lieu of axial space in the engine, thus reducing the overall length, resulting in a saving in axial space. In addition, saving in axial space, compared with an arrangement wherein the combustor is conventionally located in the axial space between the compressor and turbines, is accomplished by the arrangement of the combustor around the turbines, whereby the same axial space is used for both components.

It is an important and particularly novel feature of the arrangement of this gas turbine engine that the last stage 18 of the compressor discharges air into the diffuser section 20, which is a radially extending space allowing ample capacity for diffusion where the air is efficiently diffused and turned through approximately 90 degrees (as shown in FIGURES 1 and 2) and passed into annular chamber 22, 22a surrounding the combustor. The compressor driving turbine 34 and the power turbine 36 are in a central region and are surrounded by the combustor unit 25, 26, 27, 28, 30 and 32. Thus, the turbines 34 and 36 are surrounded by the several layers of the metallic casings of the combustor passages, and the turbines by this construction being both mechanically and thermally shielded.

The power turbine 36 rotates independently of the compressor turbine 34 and is mounted on a shaft 40, which is supported at its end by bearings 42, 43. The forward extension of the shaft 44 is connected by spline 41 with a larger diameter portion of power shaft 46 and continues forwardly concentric with but inside the previously mentioned compressor shaft 16.

The enlarged center portion 46 of the shaft extends forwardly into a reduced diameter portion 48, which is connected to another shaft portion 50 by a spline connection 53, and the shaft portion 50 is supported on the bearing 52. The shaft portion 50 rotates a planetary gear assembly 51 for reducing the speed of rotation to a suitable rotating speed in output shaft 54, which may drive a propeller on an aircraft or other power shaft.

The two shafts 16 and 46 extending from the compressor driving turbine 34 and the power turbine 36 are concentric and extend forwardly into the region of the engine which houses the compressor 14 and the gearing assembly 51. This forward portion of the engine is relatively cool and particularly adapted to carry the gearing because of its low temperature.

Figure 3:
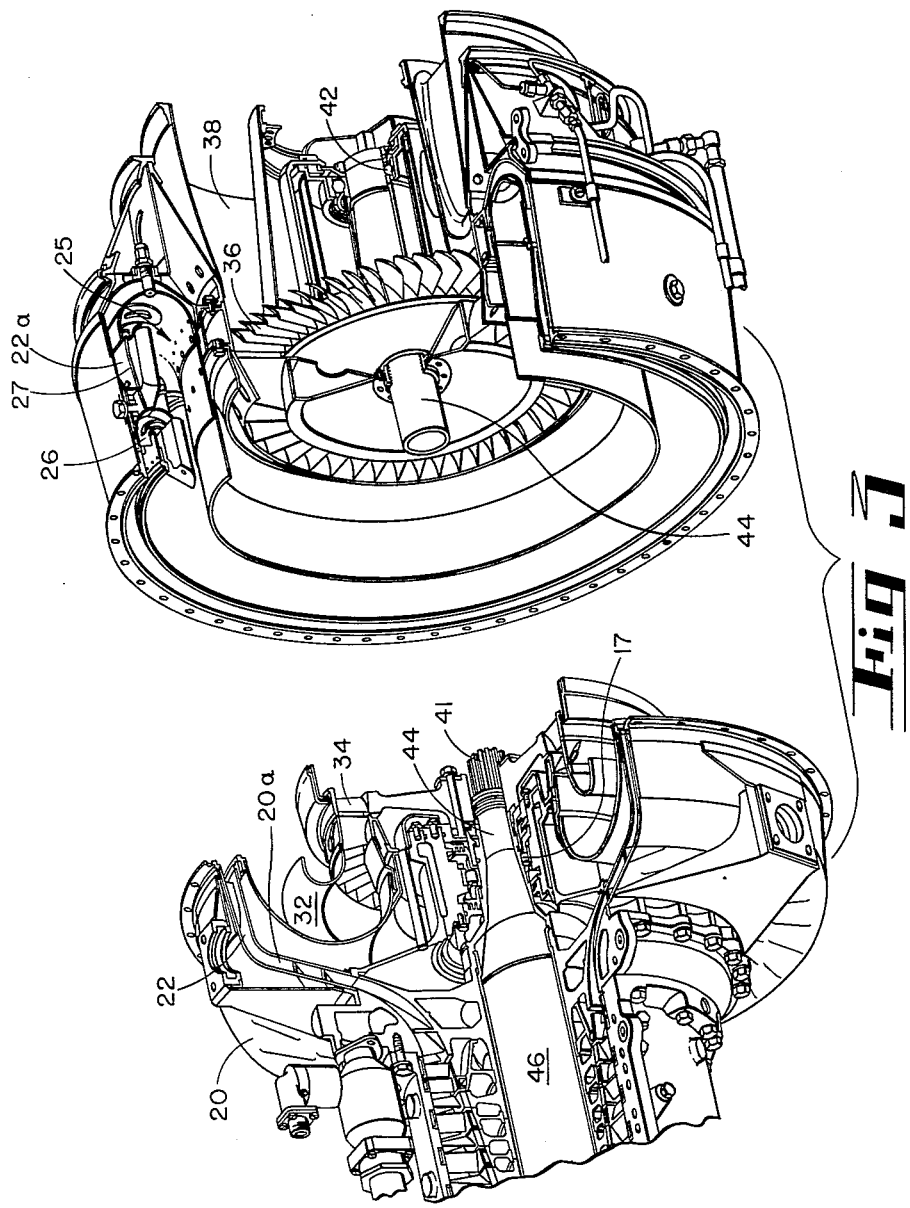
FIGURE 3 is a perspective sectional view showing the rear combustor and power turbine section of the engine removed for accessibility to the combustion chamber and turbine section of the engine.

It is also an important feature that the power turbine 36 carried on the shaft 40 has a spline connection 41 between power shaft 44 and shaft 46, so that the power turbine, together with the rear section of the combustor, may be removed (as shown in FIGURE 3). Combustor passages 25 and 32 are connected by slip joints as shown in FIGURE 3 so that the power turbine and the combustor may be removed as a unit for inspection and servicing. As shown, the removal of the rear section of the engine leaves the remainder of the engine intact, and provides for inspection and service of both the power turbine 36 and the compressor driving turbine 34 and gives access of the entire hot section of the engine, which is a special advantage in the servicing of the engine.

The arrangement of the several components of the engine structure, as above described, makes available certain important performance advantages as well as accomplishing the desired result of a compact engine. One result of the combination described is the provision of a relatively small diameter portion of the engine in front of the radial diffuser 20, thus providing the space where the accessories necessary for an engine of this type (namely, generator, fuel system components, and other units) may be assembled to the engine without objectionable protrusions of equipment beyond the major diameter of the engine. This makes for a further compactness in engine installation on the aircraft, boat or other service to which the engine may be adapted.

Figure 4:
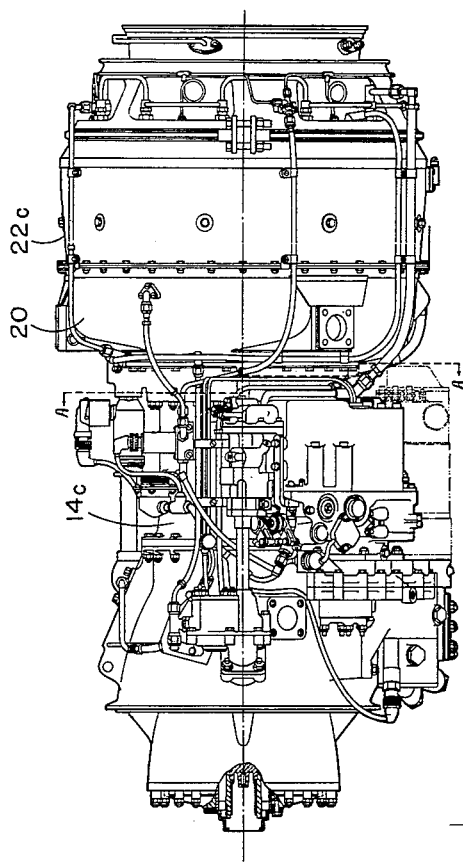
FIGURE 4 is a side view of the assembled engine with certain accessories in place.
Figure 6:
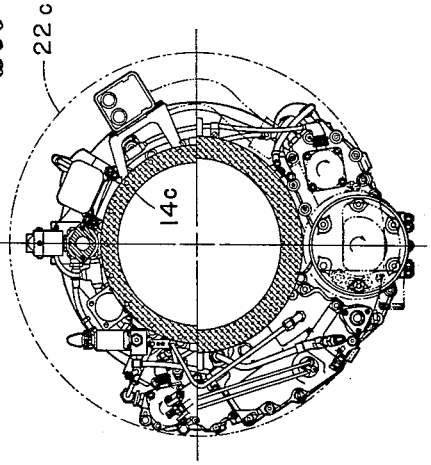
FIGURE 6 is a section on line A—A of FIGURE 4.
Figure 5:
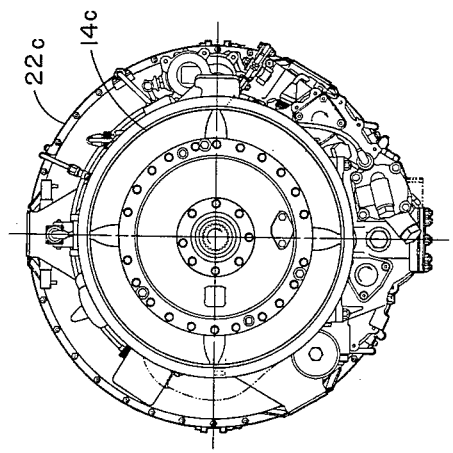
FIGURE 5 is an end view of the assembled engine.

Such a structure as above outlined is disclosed in FIGURES 4, 5 and 6. FIGURE 4 is a side view of the assembled engine, and shows a region 14c which is a housing around the compressor region of the engine, the multistage compressor having been designated by the numeral 14. It is noted that the diameter of the housing in this region 14c of the engine is substantially less than the diameter of the combustor section 22c, with adjacent diffuser 20.

It is also an advantage gained by the arrangement that the inherent advantages of an annular combustion chamber design are made available. It is recognized that an annular combustion chamber is one of the best ways to reach small combustion chamber velocity, low pressure losses, high combustion efficiencies and suitable temperature distribution. But when this type of construction is used with a so-called straight-through axial design, the necessary lengths are not available if the engine is to be kept in practical length requirements for a free-power turbine type engine with front drive, and therefore such designs may sacrifice performance. However, in the present invention, wherein the radial distances in the diffuser and in the combustion passages, as heretofore described, are used to advantage, the engine is kept within the length limitations and still the optimum diffusion and combustion passage distances are made available by the dual use of radial and axial distances as compared to axially positioned units.

It is specifically to be noted that annular combustion chambers have been used in straight-through axial designed engines, with the disadvantage that the combustor is located between the compressor and turbine and is therefore rather inaccessible to inspection and service. With the combustor located around the turbines in a larger diameter region, the combustor as well as the turbines are made accessible in the structure of the present invention by the provision of the removable section of the engine wherein the combustor and turbines are parted, so to speak, in their central region and in a plane through the combustor and between the turbines.

The structure has the added advantage, as previously mentioned, of grouping the hot portions of the engine in one part of the engine to the rear and adjacent the exhaust, and makes possible the separation of the hot units—i.e., combustor, turbine, and exhaust—at the rear of the engine and the relatively cool region of the engine forward containing the compressor, the gear units and accessories, all with the advantage of minimizing heat rejection and simplification of lubrication problems.

Figure 8:
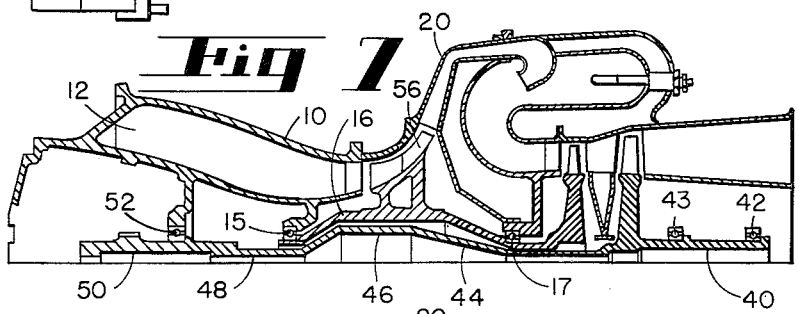
FIGURE 8 is a modified form of the engine with one-stage centrifugal compressor.

A modified form of the invention is shown in FIGURE 8, in which a centrifugal single-stage compressor 56 closely adjacent the diffuser 20 is used in lieu of the combined axial and centrifugal compressor. The placing of the compressor close to the diffuser and combustor section retains certain of the advantages of the previously described form, including the dual use of radial space for diffusion and mixing, the dual use of axial space for combustor and turbines and the folded reverse flow combustor.

Figure 9:
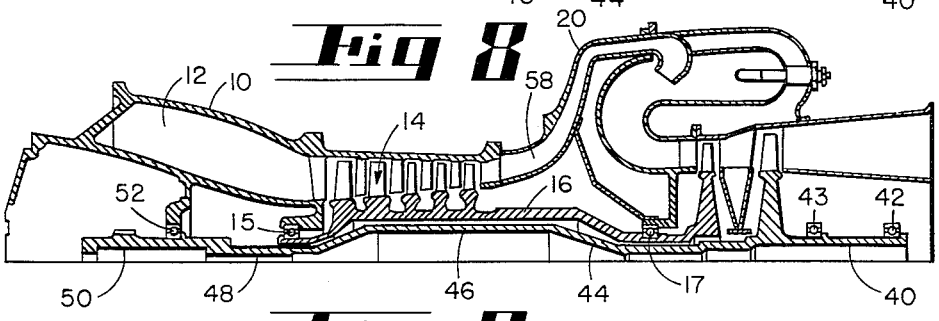
FIGURE 9 is a modified form of the engine with a multi-stage axial flow compressor.

FIGURE 9 is a further modification showing use of an axial flow compressor 14 without the last centrifugal stage. The inlet 50 to the diffuser 20, curved as shown, guides the compressed air into the diffuser.

Although the invention has been described by reference to specific structures found practical in actual operation, it is contemplated that variations and modifications may be made therein within the skill of the art without departing from the fundamental principles of the invention and within the scope of the following claims.

I claim:

1. In a gas turbine engine, the combination of: a compressor section, a turbine section, an annular combustor section surrounding said turbine section and occupying substantially the same region of axial space longitudinally of the engine as said turbine section, said compressor section comprising a multistage axial compressor and a last stage centrifugal compressor adjacent thereto, a radially positioned diffuser of substantial radial extent carrying air radially outward from the end of said centrifugal compressor to the outer periphery of said combustor section, and folded passages directing flow through said combustor in a generally radially inward direction, said radially positioned diffuser and folded passage and said radial distances for diffusion and combustion comprising a combustor region having a diameter substantially exceeding the diameter of said compressor region, said turbine section comprising a compressor driving turbine and an adjacent power turbine rearward of said compressor driving turbine, and connections for effecting removal of said power turbine and a portion of said combustor section, thereby to provide access to both of said turbines and the interior of said combustor section.

2. In a gas turbine engine, the combination of: a compressor section, a turbine section, an annular combustor section surrounding said turbine section and occupying substantially the same region of axial space longitudinally of the engine as said turbine section, said compressor section comprising a multistage axial compressor and a last stage centrifugal compressor adjacent thereto, a radially positioned diffuser of substantial radial extent carrying air radially outward from the end of said centrifugal compressor to the outer periphery of said combustor section, and folded passages directing flow through said combustor in a generally radially inward direction, said radially positioned diffuser and folded passage and said radial distances for diffusion and combustion comprising a combustor region having a diameter substantially exceeding the diameter of said compressor region, said turbine section comprising at least two adjacent turbines one rearward of the other, and connections for effecting removal of said rearward turbine and a portion of said combustor section, thereby to provide access to both of said turbines and the interior of said combustor section.

References Cited in the file of this patent

UNITED STATES PATENTS

| | | |
|---|---|---|
| 2,619,797 | Haworth | Dec. 2, 1952 |
| 2,625,790 | Petrie | Jan. 20, 1953 |
| 2,631,430 | Staley et al. | Mar. 17, 1953 |
| 2,694,291 | Rosengart | Nov. 16, 1954 |
| 2,721,445 | Giliberty | Oct. 25, 1955 |
| 2,922,278 | Szydlowski | Jan. 26, 1960 |

FOREIGN PATENTS

| | | |
|---|---|---|
| 689,353 | Great Britain | Mar. 25, 1953 |
| 311,367 | Switzerland | Jan. 31, 1956 |